United States Patent [19]

Gaubatz

[11] Patent Number: 5,734,857
[45] Date of Patent: Mar. 31, 1998

[54] PROGRAM MEMORY EXPANSION USING A SPECIAL-FUNCTION REGISTER

[75] Inventor: Gerald Gaubatz, Hamburg, Germany

[73] Assignee: U.S. Philips Corporation, New York, N.Y.

[21] Appl. No.: 346,946

[22] Filed: Nov. 29, 1994

[30] Foreign Application Priority Data

Nov. 29, 1993 [DE] Germany ............... 43 40 551.7

[51] Int. Cl.$^6$ .............. G06F 12/00; G06F 9/30; G06F 9/22
[52] U.S. Cl. ........... 395/402; 395/405; 395/406; 395/800; 395/500; 364/230.5; 364/255.1; 364/DIG. 1
[58] Field of Search .................. 395/402, 405, 395/406, 401, 800, 500; 364/230.5, 255.1, DIG. 1

[56] References Cited

U.S. PATENT DOCUMENTS 5,067,077  11/1991  Wakimoto et al. ............ 395/490
5,249,280   9/1993  Nash et al. .................. 395/405
5,255,382  10/1993  Pawloski ..................... 395/402

*Primary Examiner*—George B. Davis
*Assistant Examiner*—Than J. Nguyen
*Attorney, Agent, or Firm*—Debra K. Stephens

[57] ABSTRACT

In order to expand the address range of the program counter in a microprocessor, a register is provided as an additional special-function register which actually consists of two separate registers which are connected in series. One register supplies the most-significant address bits via an AND-gate and is also coupled to the internal data bus. The register contents are automatically changed when the program counter passes the end position or the starting position. In the case of program jumps, the old contents of the register are also stored in the stack; this requires only few additional instructions from the standard instruction set. In the case of an interrupt, the AND-gate is blocked, so that automatically the first segment of the program memory with the interrupt programs is addressed. A linear expansion of the program address range is thus achieved without degrading the compatibility.

8 Claims, 2 Drawing Sheets

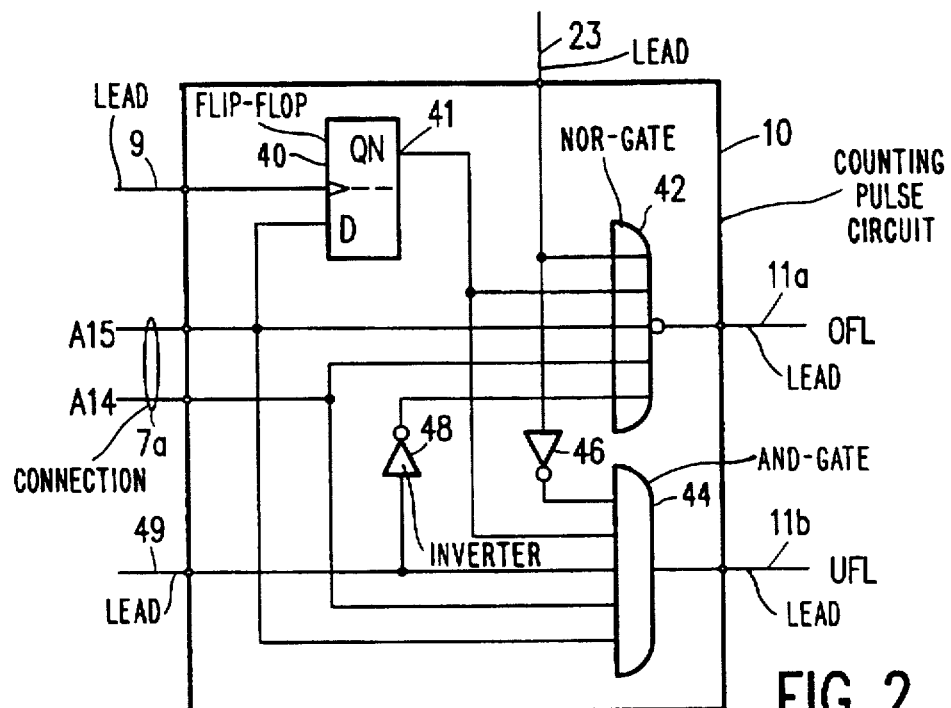
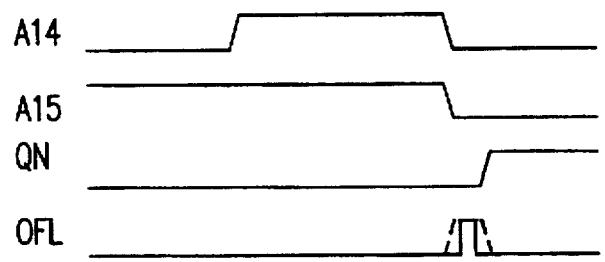
FIG. 3a
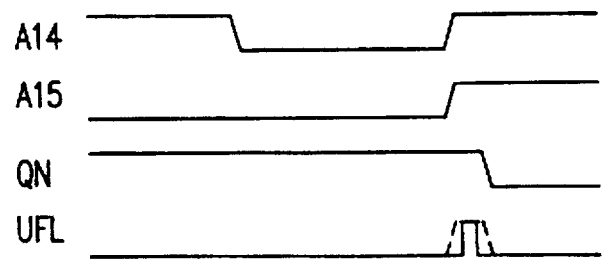
FIG. 3b

PROGRAM MEMORY EXPANSION USING A SPECIAL-FUNCTION REGISTER

BACKGROUND OF THE INVENTION

A microprocessor of this kind is known from U.S. Pat. No. 5,255,382. This document concerns notably microcontrollers which are derived from a basic type referenced 8051 and capable of addressing a program memory having a capacity of 64 K memory locations. This maximum addressable memory capacity is imposed primarily by the fact that the addresses comprise two bytes of 8 bits each. This therefore is suitably compatible with the processor core because the latter always processes one byte in parallel, i.e. the internal data bus transports 8 bits in parallel, and each instruction word in the program memory is also of a corresponding length. Any address of the program memory can thus be indicated by the contents of two successive words in the program memory.

For many applications, however, a larger program memory is desired. The addresses for such a larger program memory, however, then comprises more than 2 bytes and in the known microprocessor the additional address bits are supplied by the first register. Moreover, the output of the first register is connected to a separate stack in which the contents of the first address are stored as a return address in the event of a jump in a sub-routine. The input of the first memory is connected, via a multiplexer, to the output of the second register or to the output of the separate stack.

However, for program jumps and sub-routine calls this known microprocessor requires new instructions which combine functions of two instructions present in the instruction set of the 8051 processor. Consequently, programs containing such jump instructions are not compatible with the customary 8051 processors or with their associated programs. However, the known microprocessor requires substantial means for the expansion of the memory and the addresses for such an expanded memory are limited to three additional address bits.

SUMMARY OF THE INVENTION

Therefore, it is an object of the invention to provide a microprocessor of the kind set forth which requires only limited means to drive a larger program memory without modification of the present instruction format, thus allowing for continued use of program already present.

Absolute jumps, jumps in sub-routines and jumps triggered by interrupt signals can thus be executed in the entire address range of the program memory without requiring the formation of new instructions which are not contained in the instruction set. Moreover, a separate stack is no longer required; because the output of the first register is connected to the data bus, use can now be made of the stack in which the other address parts are customarily used in the case of jump instructions. When the general data memory is used for the stack in known manner, an almost arbitrary number of interleaved programs can be executed, i.e. this number is not restricted by the size of a separate stack. Moreover, a full additional address byte is available, so that up to 4M program memories can be addressed. Additional instructions are not required, except in the case of absolute address jumps across the limits of the 64K address range, referred to as a segment hereinafter, which instructions serve to load the additional registers or to save their contents and originate from the instruction set already available, particularly for executing data transfers within the processor.

An important function of microprocessors or microcontrollers is the processing of interrupt signals. Such signals are generated in the event of given external states or also, for example by internal timers and ensure that the microcontroller executes particular instruction sequences in predetermined address ranges of the program memory. To this end, in response to the appearance of an interrupt signal an address jump to a fixed predetermined address of the instruction memory is initiated, which address is situated within a very low address range, i.e. in the first segment. In order to enable a jump to the associated address of the program memory as quickly as possible in response to an interrupt signal even while a higher program memory segment is being addressed, due to the blocking of the AND-gates in response to an interrupt signal, all bits of the most-significant address byte obtain the value zero, so that automatically the first segment of the program memory is addressed in which the address of the interrupt subroutine is situated. It is an advantage that the old contents of the additional register are then saved and automatically become available again after the end of the interrupt subroutine if the latter does not leave the lowest segment. It is only when a jump to a higher segment of the program memory occurs during an interrupt subroutine that some additional instructions from the set of instructions present will be required as will be explained hereinafter.

Many microprocessors, notably those based on the type 8051, comprise a number of registers which are referred to as special-function registers and which can be directly addressed in a particularly simple manner by means of given instructions. In that case the microprocessors usually comprise fewer registers than possible on the basis of the number of bits for the addressing in the corresponding instructions. In an embodiment of such microprocessors in accordance with the invention, the first and the second register together form an additional special-function register. The unit formed by the two registers can thus be very quickly addressed by instructions from the instruction set present, hardware ensuring that writing always takes place in the second register and that reading is always effected from the first register, the fixed connection between the two registers also being realized by hardware. The additional instructions possibly required in the event of address jumps thus require only few additional clock cycles.

In order to enable jumps within an interrupt subroutine in a particularly simple manner, in a further embodiment of the invention the interrupt circuit comprises a first storage member which is set in response to the occurrence of an interrupt signal and which is reset upon execution of an address jump across the segment boundaries, its output being coupled to the control input of the AND-gates via a NAND-gate, a further input of which is coupled to the processing unit in order to receive a signal during the execution of an interrupt routine. Thus, in the event of such a jump within the interrupt sub-routine the blocking of the AND-gates is cancelled so that other segments of the program memory can then also be addressed.

The counting pulse circuit should automatically initiate the transition from one segment of the program memory to a neighbouring segment, so that for normal program execution the program memory appears as a single, coherent address range. This should also be the case in the event of relative program jumps which occur across the boundaries of the segment defined by two address bytes. In order to achieve this in a simple manner, a further embodiment of the invention is characterized in that the counting pulse circuit is coupled to outputs for the two most-significant address bits of the program counter and comprises a second memory stage for storing the signal state of the most-significant address bit for a given period of time after a change of state of this address bit and two gates, each of which comprises at least three inputs, the inputs of each gate being coupled to at least one output of the memory stage and to the outputs for the two most-significant address bits in such a manner, that one gate outputs a count-up pulse for the first register when both address bits change their state from high to low, and that the other gate outputs a count-down pulse for the first register when both address bits change their state from low to high. As a result of the use of only the two most-significant bits of the lower two address bytes, when a segment boundary is crossed, the direction in which the boundary is crossed can be recognized, so that automatically a correct count-up pulse or count-down pulse is generated in conformity with the relevant direction.

Evidently, the program memory need not be a single memory, integrated with the microcontroller on a chip; it may also consist of several parts for respective different address ranges; at least some parts may also be present in separate components outside the microcontroller.

BRIEF DESCRIPTION OF THE DRAWINGS

Embodiments of the invention will be described in detail hereinafter with reference to the drawing. Therein:

FIG. 2 shows an embodiment of the counting circuit shown in FIG. 1, and FIGS. 3a and 3b show diagrams illustrating the generating of the output signals of the counting circuit.

DESCRIPTION OF THE PREFERRED EMBODIMENTS

Figure 1:
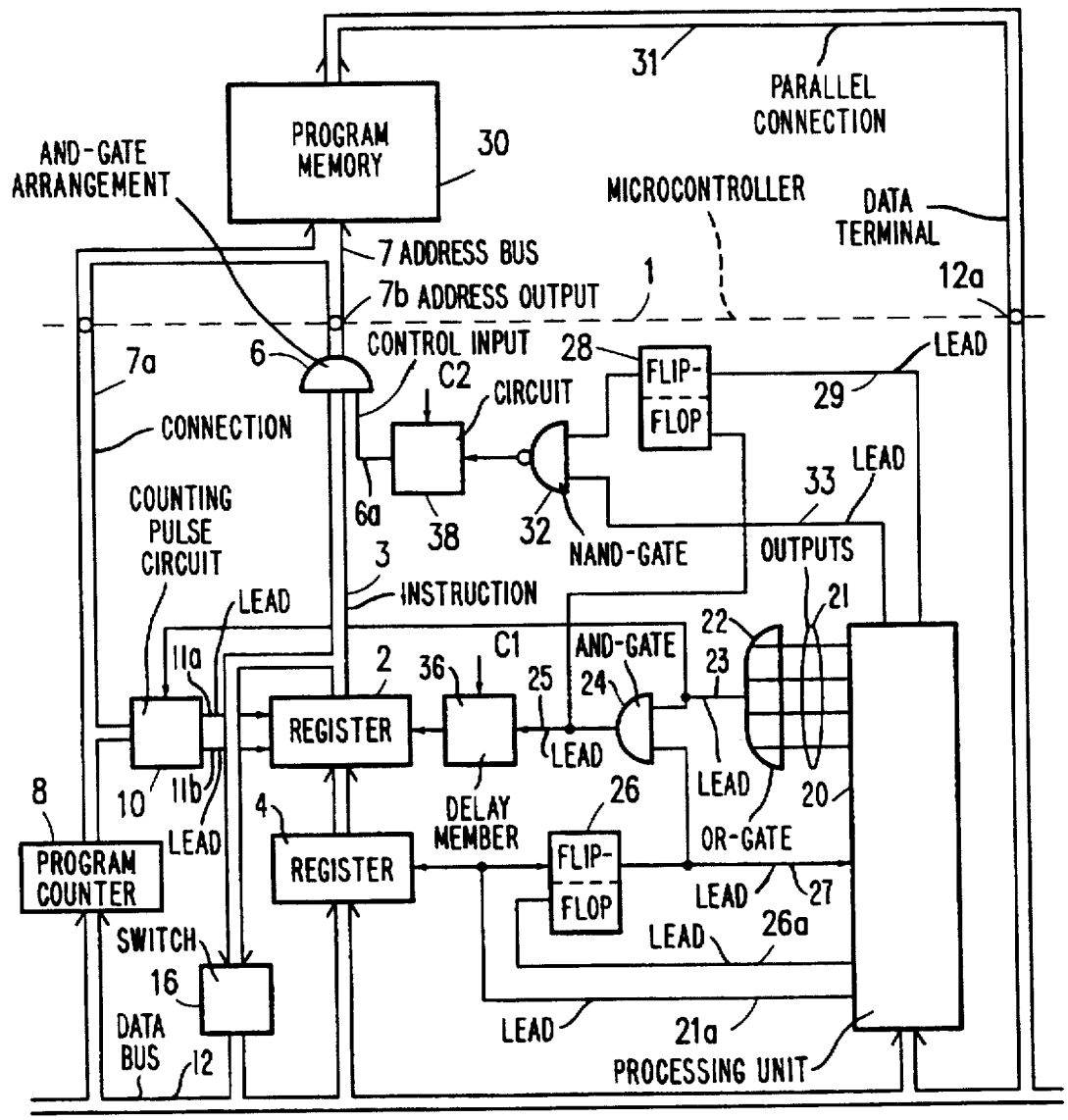
FIG. 1 shows a block diagram of some crucial parts of a microcontroller in accordance with the invention.

A microcontroller 1 as shown in FIG. 1 comprises a number of circuits or elements, only a few of which are shown. Via an address bus 7, the microcontroller 1 is connected to a program memory 30 which is arranged outside the microcontroller, but it is assumed herein that it represents only a part of the overall program memory, a further, notably smaller part for the lower addresses being present in the microcontroller 1; however, for the sake of simplicity this is not shown herein. The data output of the program memory 30 is connected, via a parallel connection 31, to a data terminal 12a of the microcontroller 1 which is connected to the data bus 12. Any switches present in data paths have been omitted for the sake of clarity, because they do not relate to the principle of operation.

A processing unit 20 which decodes notably instructions received and which outputs different control signals via separate control leads is connected to the internal data bus 12. Only a few of these control leads, to be explained hereinafter, are indicated herein.

Also provided is a program counter 8 which supplies a part of the address bits of the address for the program memory 30 via a connection 7a. It is assumed that the program counter 8 has a width of two bytes and hence outputs the address bits A0 to A15 via the connection 7a.

Finally, there are provided two registers 2 and 4; the register 2 can take over data from the register 4 and applies data taken over, via a connection 3, to an AND-gate arrangement 6 which supplies, via an address output 7b of the microcontroller 1, a part of the address bits for the address bus 7. For each individual lead of the connection 3 the gate arrangement 6 comprises a single AND-gate, all AND-gates being controlled in common via a control input 6a. Via the connection 3 the output of the register 2 is also connected to a switch 16 via which the contents of the register 2 can be transferred to the internal data bus 12. Furthermore, the contents of the register 2 can be incremented or decremented by one unit in response to a counting pulse on one of the leads 11a and 11b. The counting pulses on the leads 11a and 11b are supplied by a counting pulse circuit 10.

A parallel input of the register 4 is connected to the internal data bus 12 and takes over the value on the internal data bus 12 in response to a write signal on a lead 21a which originates from the instruction decoding circuit in the processing unit 20. Further elements shown in FIG. 1 will be described in detail hereinafter with reference to the various functions.

It is first assumed that a simple program in the form of a linear sequence of instructions is executed. The contents of the instruction memory, or the address range for the addressing of these contents, are subdivided into segments, the address range of a segment being determined by the number of stages of the program counter 8, for example 16 stages, corresponding to 2 bytes. The individual segments are determined by the contents of the register 2. When the linear program crosses a segment boundary, i.e. the program counter 8 returns to its initial position via its highest position, the counting pulse circuit 10 connected to some outputs of the program counter 8 generates a count-up pulse on the lead 11a for the register 2, so that the contents thereof are incremented by one unit. The beginning of the next segment in the program memory is thus automatically addressed, without any steps being required within the program for this purpose.

Programs, however, normally include jumps which can be distinguished as relative jumps and absolute jumps. In the case of a relative jump, a value is added to or subtracted from the contents of the program counter 8, said value being indicated in the instruction, preferably in the second byte of a two-byte instruction. When the program counter 8 exceeds its maximum position in the case of an upward jump, i.e. a segment boundary is crossed, the counting pulse circuit 10 also generates a count-up pulse for the register 2 on the lead 11a. The same holds for a return jump when a segment boundary was crossed in the forward direction and subsequently a return jump takes place across the segment boundary. The program counter 8 then jumps from a low value to a high value and the counting pulse circuit 10 generates a count-down pulse on the lead 11b which decrements the contents of the register 2 by one unit. In this respect it is assumed that a relative jump can take place over only a small part of the address range of a segment. In any case, in the event of a relative jump the contents of the register 2 are automatically modified in the correct manner, without it being necessary to take special steps within the program.

However, the situation is different in the case of absolute jumps. These jumps may be almost of arbitrary magnitude and in the case of such a jump the destination address, at which the program is to be continued, is indicated directly in the jump instruction. Such a jump instruction in the available set of instructions comprises three bytes, the last two bytes of which are provided to indicate the destination address. For as long as a jump takes place only within a segment, the contents of the register 2 are not changed. A simple jump instruction in the program then suffices.

However, if a jump is to take place also to another segment, the contents of the register 2 must also be changed. This is realised by way of a normal data transport instruction, the register 2 and the register 4 then being considered to be one unit which is referred to as PACE; the unit register PACE is a special function register with an address which is not utilized in known microcontrollers, so that an address jump in the program is as follows:

| 1 MOV | PACE, # data |
| 2 LJMP | addr 16 |

The instruction 1 means that the value "data" indicated in the second byte in this instruction, is transferred to the register PACE. In the circuit shown in FIG. 1 this means that a write signal is generated on the lead 21a, said write signal being used to write the value "data" in the register 4 and at the same time to set a flipflop 26. Consequently, a high signal occurs on the lead 27, which high signal enables an AND-gate 24 and is also applied to the processing unit 20 for preventing immediate processing of any interrupt signal arriving. This ensures that an address jump, in this case comprising two instructions, is indeed executed in a coherent fashion, as otherwise incorrect operation may occur in given circumstances.

The instruction 2 sets the program counter 8 to the 2-byte address indicated in this instruction. On one of the outputs 21, being associated with decoded jump instructions, the processing unit 20 generates a signal which reaches, via an OR-gate 22, the lead 23, the AND-gate 24 and the lead 25, a delay member 36 which allows this signal to become active only in a given clock phase C1 during the execution of the instruction, i.e. exactly at the instant at which the program counter 8 allows activation of the new address on the output; at this instant the contents of the register 4 are transferred to the register 2, so that all bytes of the new address appear simultaneously on the address bus 7. The flipflop 26 is reset again by a signal from the processing unit 20, via the lead 26a. This signal appears for each instruction, so that it is ensured that under normal conditions an interrupt signal can be processed immediately.

The counting pulse circuit 10 is not required in the case of absolute program jumps, but the occurrence of false counting pulse signals must be prevented. This is because when, for example a jump occurs from an address at the beginning of a segment to an address at the end of a segment, the counting pulse circuit interpretes this jump as a short relative jump backwards across the segment boundary. The lead 23, on which a signal occurs for each absolute jump under the influence of the OR-gate 22, therefore, is also connected to the counting pulse circuit 10 in order to suppress any counting pulse signal generated therein.

A special kind of absolute jump occurs when, within a program run, there is to be called a subroutine which starts at a given, remote memory location. This is because in that case, after termination of the subroutine, an automatic return should take place to the location wherefrom the subroutine has been called. To this end, upon calling of a subroutine the instantaneous program address must be buffered in the so-called stack. This is a memory range in a data memory (not shown) which is addressed by a given addressing device. The buffering of the contents of the program counter 8 upon calling of a subroutine takes place automatically during the execution of the instruction, but additionally the contents of the register 2 must also be buffered. This is realised by way of the following instruction sequence:

| | 3 MOV | direct,PACE |
| | 4 MOV | PACE,#data |
| | 5 LCALL | SUBR |
| | . | |
| Subr: | 6 PUSH | direct |
| | . | |
| | 7 POP | PACE |
| | 8 RET | |

By way of the instruction 3 the contents of the register 2, i.e. of the register denoted by the reference PACE, are read via the switch 16 so as to be transferred, via the internal data bus 12, to a memory location of a data memory (not shown) which is indicated by the address "direct". This address is preferably reserved exclusively for these program jumps and is not used otherwise.

Via the instruction 4 the value "data" contained in the instruction is written into the register 4. This value indicates the segment in which the subsequent subroutine commences. Finally, by way of the instruction 5 the contents of the instruction counter 8 are stored in the stack, after which the program counter 8 is set to the address at which the sub-routine commences in the relevant segment, and at the same time a load signal for loading the contents of the register 4 into the register 2 is generated again via the OR-gate 22, the AND-gate 24 and the block 36. Thus, the address bus 7 then carries the complete address for the beginning of the subroutine. The subsequent instructions of the main program are irrelevant in this respect and hence are denoted only by dots.

The first instruction in the subroutine is the instruction 6 whereby the contents of the memory location "direct" are stored in the stack, that is to say immediately behind the value of the program counter 8 at which the main program has been left. The return jump address has thus been stored in the stack in the correct sequence.

Subsequently, the instructions for executing the subroutine are issued, and at the end the instruction 7 occurs whereby the segment address byte of the return jump address is loaded from the stack into the register PACE. This means that this value is written into the register 4. The instruction 8 implies the return jump to the main program in that the contents of the preceding memory locations of the stack are loaded into the program counter 8 again and, simultaneously with this loading operation, the contents of the register 4 are also transferred to the register 2, so that all bytes of the address of the main program are thus simultaneously available again.

It is to be noted that the instruction sequence is the same for all subroutine calls across segment boundaries, and so is the arbitrarily selectable address "direct", because it is required only for the execution of the instruction jump and becomes already free again after the instruction 6.

Thus far it has been assumed that the AND-gate arrangement 6 was enabled via the common control input 6a. This was the case for the instruction runs described thus far, because at least the lead 33 continuously receives a logic signal "zero" from the processing device 20, so that a high potential is continuously generated across the NAND-gate 32, which potential is distributed directly via the circuit 38. In the event of one of the described program jumps into another segment, moreover, via the signal then occurring on the lead 25, a flipflop 28 is set to a position in which it also applies a high potential to the OR-gate 32.

Correct program execution must also be ensured when interrupt signals occur. In that case a program jump must take place to a given memory location in the lowest segment of the program memory or, when several different interrupt signals of possibly different priority must be processed, a program jump must occur to the lower segment to a memory location which is dependent on the interrupt signal. These memory locations are predetermined. The interrupt signals are applied to the processing device 20 via inputs which are not shown.

When an interrupt signal occurs, a high signal appears on the leads 29 and 33. The flipflop 28 is thus switched over so that it also applies a high signal to the NAND-gate 32. The circuit 38 thus receives a low signal from the NAND-gate 32 and in given phase CT within the interrupt instruction, i.e. when the program counter 8 is set to the interrupt address, this low signal is applied from the OR-gate 32 to the control lead 6a so that the gate arrangement 6 is blocked and all bits on the output 7b have the value "0", i.e. the lower segment is automatically addressed. The contents of the register 2 are then saved.

When the interrupt program starting at the interrupt address is present completely within the lowest segment, as will usually be the case, at the end of the interrupt program the program counter 8 will be set, under the influence of the return jump instruction at the end of the interrupt program, to the address of the main program which succeeded the location in which the interrupt signal occurred. At the same time the signal on the lead 33 becomes low again, so that the NAB-gate 32 again receives a low input signal, thus generating a high output signal which reaches the AND-gate arrangement 6 via the circuit 38 and the control lead 6a, so that automatically the same segment is addressed again as in the location of the main program in which the interrupt signal had occurred. These interrupt programs, therefore, do not require special steps within the program.

However, it may occur that an interrupt program requires a subroutine which is present in another segment of the program memory. This means that a program jump must be executed within the interrupt program, which program jump also changes the contents of the register 2. In this case, however, the instantaneous contents of the register 2 must be saved and loaded back when the interrupt program is terminated. Moreover, an interrupt signal may occur at arbitrary instants, for example also between the instructions 3 and 4 of the described normal program jump. It is only between the instructions 4 and 5 that an interrupt instruction is not executed immediately; its execution then starts only after the instruction 5. However, should a jump occur in an interrupt program after the instruction 3, the return jump to the instruction 4 takes place after its execution, and for the subsequent program it is assumed that the address "direct" in the instruction 3 stores the contents of the register 2, i.e. PACE. Therefore, the contents of the address "direct" must also be saved, because for a subroutine call in another segment in the execution of the interrupt program the address "direct" is also used.

Therefore, such an interrupt program must be composed as follows:

| 9 PUSH | PACE |
|--------|------|
| 10 PUSH | direct |
| . | |
| . | |

-continued

| 11 MOV | direct, #0 |
|--------|------------|
| 12 MOV | PACE,#data |
| 13 LCALL | SUBR |
| . | |
| 14 POP | direct |
| 15 POP | PACE |
| 16 RETI | |

The previous contents of the program counter 8 are stored in the stack by way of the jump to the interrupt program. The first instruction in the interrupt program is the instruction 9 whereby the contents of PACE still present are saved in the stack. By way of the next instruction 10, subsequently the contents of the address "direct" are also saved in the stack. The actual interrupt program as denoted by the dots then commences.

The instructions 9 and 10 can be arranged also at other locations preceding the instruction 11 in the interrupt program.

When a program jump is to take place to a sub-routine in another segment, in principle the instruction sequence 3 to 5 must be executed again as in the case of a normal program jump. However, it must be ensured that the return jump from this subroutine again takes place to the lowest segment with the segment address "0" wherefrom the program jump from the interrupt program takes place. To this end, by way of the instruction 11 not only the contents of PACE, relating to the previously interrupted program and already saved by the instruction 9, are loaded but also the value "0" (in conformity with the segment 0). The instructions 12 and 13 then correspond directly to the instructions 4 and 5 in the event of a normal program jump.

The subroutine itself is not indicated, but it also commences with the instruction 6, like the previously described normal program jump, whereby the contents of the address "direct", i.e. in this case the value "0", are stored in the stack adjacent the address of the instruction counter 8 stored in response to the instruction 13. At the end of this subroutine there is the instruction 7 whereby the value "0" is loaded from the stack into PACE, after which the return jump in the interrupt program to the segment "0" takes place. This explains why the instructions 9 and 10 must buffer the original contents of PACE and the address "direct" in the stack.

After the return jump to the interrupt main program, the latter is continued and at the end of the interrupt program there are the instructions 14 and 15 whereby the old state, prior to the interrupt signal, in PACE and the address "direct" are restored again. In response to the instruction 16 the normal return jump occurs to the interrupted main program which can then be continued as usual.

In this instruction sequence, the following functions are executed in the circuit shown in FIG. 1. As already described, the jump to the interrupt program blocks the gate arrangement 6 and switches over the flipflop 28. The instructions 9, 10 and 11 of the interrupt program are data transport instructions which have hardly any effect on the circuit shown.

Under the control of the instruction 12, the value "data" is applied to the register 4 and is written therein by a write signal, generated on the lead 21a by this instruction, and at the same time the flipflop 26 is switched over. In response to the next instruction 13, a write signal is applied to the register 2 via one of the output leads 21, the OR-gate 22, the AND-gate 24 then enabled via the lead 27, and the circuit 36, so that the contents of the register 4 are taken over. The signal generated by the AND-gate 24 on the lead 25, however, also switches back the flipflop 28 again, because the signal on the lead 29 was generated only in response to the jump to the interrupt program. Consequently, the NAND-gate 32 again receives a low signal on an input so that, after a corresponding delay in the circuit 38, the control lead 6a receives a high signal and enables the gate arrangement 6 so that the contents transferred to the register 2 appear on the additional address output 7b for addressing the program memory. Thus, the instructions of the sub-routine are addressed, the flipflop 28 maintaining its state and continuously enabling the AND-gate arrangement 6. This also holds when at the end of the subroutine the return jump to the interrupt program takes place, and also for the return jump from the interrupt program to the interrupted main program. As from that instant the lead 33 again carries a low signal, so that the NAND-gate 32 receives a second low signal which, however, does not influence the enabled state of the AND-gate arrangement. Thus, the address output 7b is continuously governed by the contents of the register 2.

Program jumps to arbitrary segments of the program memory are thus possible while requiring only few additional instructions from the customary set of instructions.

Most elements of the circuit shown in FIG. 1, such as registers, gates and flipflops, are of generally known construction. The processing device 20 constitutes the core of a customary microprocessor without special features. Merely a feasible embodiment of the counting pulse circuit 10 will be described in detail hereinafter with reference to the FIGS. 2 and 3.

In FIG. 2 the counting pulse circuit 10 comprises a flipflop 40, a NOR-gate 42 and an AND-gate 44 as well as two inverters 46 and 48. A14 and A15 represent the two most significant bits of the program counter 8 on the connection 7a in FIG. 1. Via the lead 9, a clock signal is applied, which clock signal precedes each change of address of the program counter. Via the lead 49 there is applied a further clock signal which appears briefly after a change of address of the program counter, i.e. when a new instruction is to be read from the program memory. A generated counting pulse signal appears on the lead 11a or 11b. The generating of a counting pulse signal is prevented by way of a signal on the lead 23.

It will first be assumed that the signal on the lead 23 is low, so that the inverter 46 outputs a high signal. The flipflop 40 is a D-flipflop whose D-input is linked to the most-significant address bit A15. The signal QN on the output 41 of the flipflop 40 follows, in inverted form and always in response to the positive edge of the clock signal on the lead 9, the variation of the signal indicating the most-significant address bit A15, as can be seen in FIG. 3a.

Assuming that the program counter counts linearly upwards until it reaches its highest position, the address bit A14 first assuming a high signal value which has already been assumed by the address bit A15, subsequent to the maximum position both address bits A14 and A15 substantially simultaneously assume a low signal value in response to the next clock signal for the program counter, whereas the output QN of the flipflop 40 still has a low signal value. If the output signal of the inverter 48 is not considered, a signal as denoted by a dashed line in FIG. 3a would appear on the output lead 11a which is denoted by the reference OFL (overflow). From this signal, a brief positive pulse on the lead 49 extracts a pulse which is denoted by a solid line in FIG. 3a and which ensures inter alia that interference pulses occurring in particular circumstances are reliably avoided. FIG. 3 shows that the OFL pulse is also generated when the program counter 8 in FIG. 1 changes over from a high value to a low value due to a jump, for as long as this jump is not too large, i.e. for as long as both address bits A14 and A15 change over from a high to a low value.

A corresponding procedure takes place during countdown or in the case of a return jump of the program counter 8 from a low position at the beginning of a segment to a high position at the end of a preceding segment. In the low position of the program counter 8 both address bits A14 and A15 have a low value. In the case of a limited return jump across the segment boundary, both address bits A14 and A15 assume a high value, whereas the output QN of the flip flop 40 still retains a high value for one clock phase. Consequently, on the output 11b denoted by the reference UFL (borrow) a signal occurs which is denoted by a dashed line in FIG. 3b. A brief, positive pulse on the lead 49 again extracts a pulse which is denoted by a solid line in FIG. 3b.

FIG. 2 clearly shows that any output signal OFL or UFL in the circuit can be suppressed by way of a high signal on the lead 23.

This must take place for each jump instruction whereby a jump is possible within the entire segment address range, i.e. for example from the beginning until the end of the segment. These instructions are decoded on the leads 21 in FIG. 1 and combined in the OR-gate 22 so as to be applied to the counting pulse circuit 10 via the lead 23.

The circuit shown in FIG. 2 can also be used for arbitrary counters, notably for very long counters, in order to generate a carry signal or a borrow signal without necessitating complete decoding of the entire counter position.

What is claimed is:

1. A microprocessor comprising:

a processing unit for receiving and decoding instructions;

an internal data bus;

a program memory for supplying instructions;

a program counter for a predetermined number of address bits for addressing the program memory;

a first register comprising an input and an output for supplying additional most-significant address bits for the program memory on an address output;

a second register comprising an input which is coupled to the internal data bus and an output which is coupled to the input of the first register;

a counting pulse circuit which comprises inputs which are connected to outputs of the program counter;

counting pulse outputs connected to further inputs of the first register when the program counter passes through its maximum or minimum position; and a stack for storing return jump data, the output of the first register being coupled to the internal data bus, via switches which are controlled by the processing unit, to buffer contents of the first register in the event of a subroutine call, to store these contents in the stack by way of the first instruction of the subroutine, and to write these contents from the stack into the second register at the end of the subroutine, the output of the first register being connected to the address via AND-gates, and a common control input of the AND-gates being connected to an interrupt circuit for blocking the AND-gates at least at a beginning of the processing of an interrupt signal.

2. A microprocessor as claimed in claim 1, comprising a number of directly addressed special-function registers, wherein one of said special-function registers comprises said first and said second registers.

3. A microprocessor as claimed in claim 2, wherein the interrupt circuit comprises a first storage member set in response to occurrence of an interrupt signal and which is reset upon execution of an address jump, an output of said interrupt circuit being coupled to the common control input of the AND-gates via a NAND-gate, a further input of said NAND-gate being coupled to the processing unit for receiving a signal during execution of an interrupt routine.

4. A microprocessor as claimed in claim 3, wherein the counting pulse circuit is coupled to outputs for two most-significant address bits of the program counter and comprises a second memory stage for storing a signal state of a most-significant address bit of the two most-significant address bits for a given period of time after a change of state of the most-significant address bit and two gates, each gate comprising at least three inputs, the inputs of each gate being coupled to at least one output of the second memory stage and to the outputs for the two most-significant address so that one gate of the two gates outputs a count-up pulse for the first register when both most-significant address bits change their state from high to low, and the other gate outputs a count-down pulse for the first register when both most-significant address bits change their state from low to high.

5. A microprocessor as claimed in claim 2, wherein the counting pulse circuit is coupled to outputs for two most-significant address bits of the program counter and comprises a second memory stage for storing a signal state of a most-significant address bit of the two most-significant address bits for a given period of time after a change of state of the most-significant address bit and two gates, each gate comprising at least three inputs, the inputs of each gate being coupled to at least one output of the second memory stage and to the outputs for the two most-significant address so that one gate of the two gates outputs a count-up pulse for the first register when both most-significant address bits change their state from high to low, and the other gate outputs a count-down pulse for the first register when both most-significant address bits change their state from low to high.

6. A microprocessor as claimed in claim 1, wherein the interrupt circuit comprises a first storage member set in response to occurrence of an interrupt signal and reset upon execution of an address jump, an output of said interrupt circuit being coupled to the common control input of the AND-gates via a NAND-gate, a further input of said NAND-gate being coupled to the processing unit for receiving a signal during execution of an interrupt routine.

7. A microprocessor as claimed in claim 6, wherein the counting pulse circuit is coupled to outputs for two most-significant address bits of the program counter and comprises a second memory stage for storing a signal state of a most-significant address bit of the two most-significant address bits for a given period of time after a change of state of the most-significant address bit and two gates, each gate comprising at least three inputs, the inputs of each gate being coupled to at least one output of the second memory stage and to the outputs for the two most-significant address so that one gate of the two gates outputs a count-up pulse for the first register when both most-significant address bits change their state from high to low, and the other gate outputs a count-down pulse for the first register when both most-significant address bits change their state from low to high.

8. A microprocessor as claimed in claim 1, wherein the counting pulse circuit is coupled to outputs for two most-significant address bits of the program counter and comprises a second memory stage for storing a signal state of a most-significant address bit of the two most-significant address bits for a given period of time after a change of state of the most-significant address bit and two gates, each gate comprising at least three inputs, the inputs of each gate being coupled to at least one output of the second memory stage and to the outputs for the two most-significant address so that one gate of the two gates outputs a count-up pulse for the first register when both most-significant address bits change their state from high to low, and the other gate outputs a count-down pulse for the first register when both most-significant address bits change their state from low to high.

* * * * *